United States Patent Office 2,994,060
Patented July 25, 1961

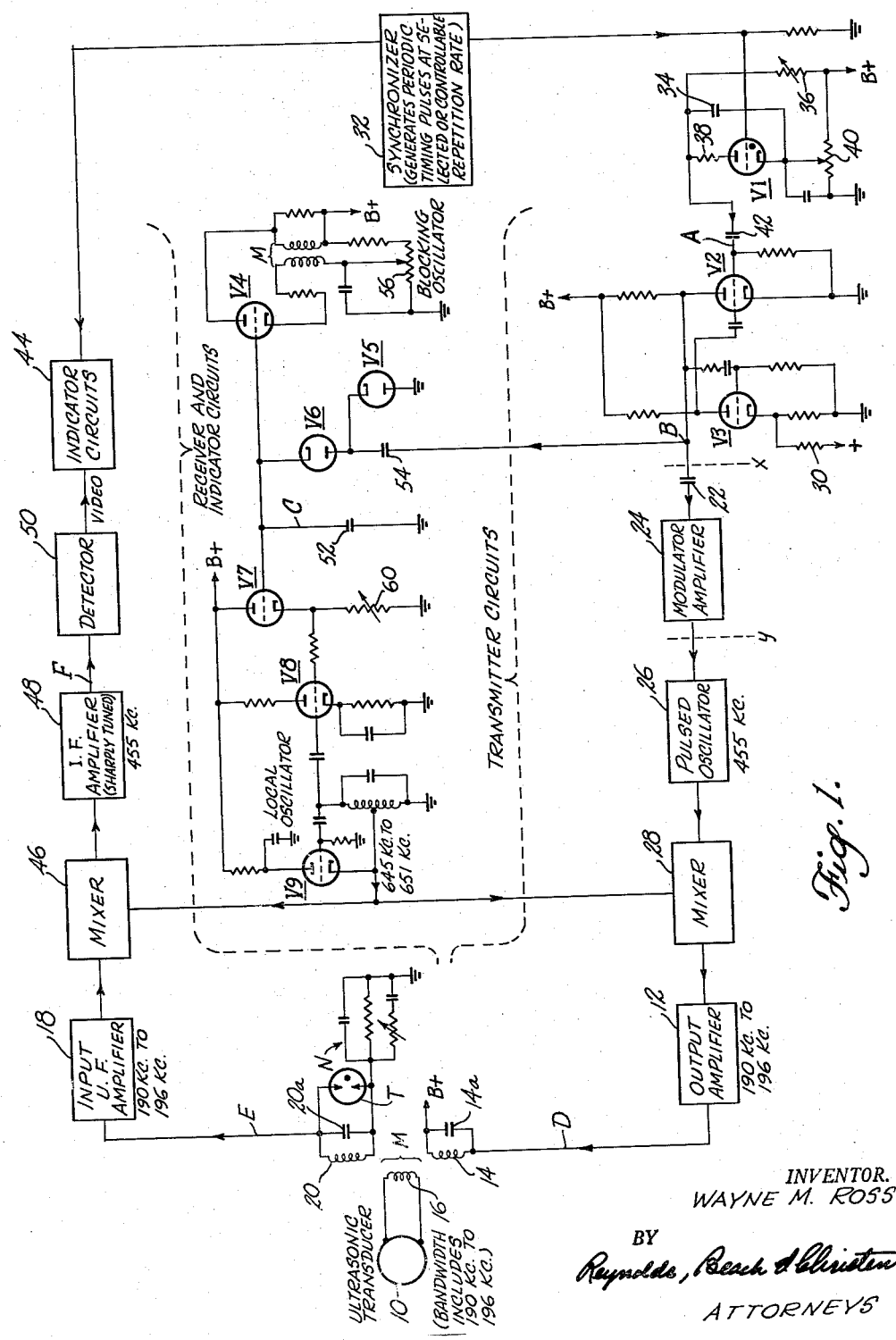

2,994,060
SYSTEM FOR PROPAGATING AND RECEIVING STEPPED FREQUENCY
Wayne M. Ross, Seattle, Wash., assignor to Minneapolis-Honeywell Regulator Company, Minneapolis, Minn., a corporation of Delaware
Filed Sept. 15, 1952, Ser. No. 309,576
11 Claims. (Cl. 340—3)

This invention relates to propagative wave energy systems or the like, and generally concerns those of the type wherein recurrent pulses of wave energy are generated for reception or utilization only during the particular periods between pulses, which immediately follow transmission of the respective pulses to be received or utilized. A specific example of such a system, with reference to which the present invention is illustratively described herein, is an underwater remote object detecting system or sonar of the pulse-echo type which determines the distance to an underwater object or reflecting surface from a transmitting and receiving station by measuring the length of time required for pulses of sound to propagate to and from such object or surface. It should be understood, however, that the invention is not necessarily confined in its useful application to that type of system, nor to the illustrative embodiment, but has a variety of possible detailed forms and uses, as will hereinafter appear to those skilled in the art.

The chief problem in pulse operated systems with which this invention deals is that of interference or confusion caused by some of the energy of one transmitted or generated pulse entering the receiver at a time when it can no longer be useful or may create confusion or misoperation. In a pulse-echo type detecting system, for example, a first echo signal resulting from one transmitted pulse may not return to the system, due to the great distance to a remote reflecting object, until after the next succeeding transmitted pulse leaves the transducer. The first echo signal is therefore received during the interval when echoes caused by the later pulse reflected from closer objects are received and is indistinguishable from them, giving the impression on an indicator that, like these other echo signals, it is likewise caused by a nearby reflecting object. The problem is intensified in systems requiring relatively high pulse repetition rates because belated or ultra-range echoes and other, after-effects of the individual transmitted pulses have less time to die out before their successors occur as the pulse repetition rate is increased.

In order to appreciate the nature and importance of this type of problem in the case of an underwater detecting system of the type mentioned, it should be noted that it is usually not sufficient for reliable detection that a single pulse or occasional pulses of ultrasonic energy be transmitted into the search area in order to detect the presence of an object therein. An isolated signal of single occurrence easily goes unnoticed by the operator, especially if local noise or ultrasonic reverberations are appreciable relative to signal intensity. However, transmission of two and preferably more pulses in relatively close succession produces echo signals readily distinguishable from random noise effects by their repetitive similarity. Moreover, on an integrating type indicator such as a cathode ray tube operated as a PPI or A-scope, for example, closely repeated signals produce a much clearer indication than one signal does because of the persistence of the fluorescent screen material.

Rapidly recurrent transmitted pulses are particularly essential in scanning-type systems wherein the ultrasonic transducer is swung progressively through an angular search range appreciably greater in width than the effective angular width of the ultrasonic beam. Unless the transmitted pulses occur in rapid succession, an object may be missed altogether as a result of sweeping the beam past it in a period between succeeding transmitted pulses. The same possibility of failing to detect an object exists even in the case of a system in which the direction of the transducer is fixed, because rapid turning of the mother vessel or rapid movement of a remote object across the energy propagation path is equivalent to rapid scanning of the transducer. A rapid pulse repetition rate is also necessary if the rapid movements of a remote object relative to the mother vessel are to be recorded or displayed on a system indicator as a reasonably continuous trace instead of as a series of widely separated spots which may appear to have no relationship to each other.

Obviously, therefore, the transmission of repeated pulses of energy is essential; moreover, adjusting the frequency of repetition to achieve the minimum permissible interval between succeeding transmitted pulses is also desirable in most applications of sonar. At best that interval cannot be made as short as might sometimes be desired in underwater sound systems because of the relatively low velocity of ultrasonic energy propagation in water and the necessity of allowing ample time between successive transmitted pulses for the return of echo signals from the outer limit of the area or space being searched by the system.

The necessity or desirability of a relatively high pulse repetition rate may also exist in other types of systems, including special radar systems, pulse operated systems for conducting geological surveys or soundings, subterranean well inspections, flaw detection in manufactured parts, location of faults in electric telegraph and power transmission lines, etc., and various others.

In general, therefore, the problem of instant concern, which is intensified in systems wherein the pulse repetition rate is relatively high, is one of considerable magnitude, and the more so because of its possible occurrence in divers types of systems including but not necessarily limited to pulse-echo type detecting systems.

With more particular and detailed reference to pulse-echo type detecting systems, the type of interference mentioned above may in some situations result from multiple echoes, i.e. wave energy reflecting back and forth between the remote object and a system-carrying vessel and being detected in the receiver on each return to the system. This can be particularly noticeable in the case of a pulse-echo type ultrasonic depth finder operating at high pulse repetition rates in rather shallow water, for example. Each transmitted pulse experiencing multiple reflections produces several bottom echoes one of which may be received in the interval following the succeeding pulse, so that it becomes confused with the initial or depth-indicating echo signal produced by the latter. The belated signal may occur at a time during the succeeding cycle of operation which has no necessary relationship to the true depth of water, and could be dangerously misleading.

The same type of interference or confusion may be caused by echoes returning from objects at distances beyond the maximum useful operating range, the limit of which is necessarily determined by the length of the time interval between successive transmitted pulses. Thus it is possible that the returning echo from an object, especially a large object, located beyond the intended range limit, will be detected by the system receiver in the interval following one transmitted pulse whereas such echo is the result of a previous transmitted pulse finally returning to the system as a reflection from such overly distant object. Such a signal appears to the operator as an object located within the intended operating range of the system, or it might be of such large-intensity that it could even mask or obscure the signal from a small object which actually did lie at that particular range.

Even if it were known to be from an object beyond range its true location would still not be certain, inasmuch as it would have no determinable relationship to the timing of a cathode ray tube sweep trace or other measuring means synchronized with the transmitted pulse.

The same type of interference or confusion may come also from echo signals which return to the system by indirect paths from reflecting objects within the intended operating range of the system by direct measure of distance. An example of this occurs in the case of a vessel lying near the intended maximum range of the system producing a reflection, part of which, instead of returning directly to the system, travels obliquely and reflects off a second vessel or object lying a substantial distance to one side of the direct path of propagation, and finally arrives back at the detecting system after the next succeeding transmitted pulse has been generated and the indicator conditioned for receiving echoes during the succeeding pulse interval. Such a signal also is indistinguishable from that from an object lying at closer range.

As mentioned, problems of this type may occur in other systems as well, even certain ones wherein the receiving means may be located remotely from the transmitting means.

In addition to providing a method overcoming the type of problem outlined above, the present invention comprises novel electrical circuit apparatus for implementing the method in a manner which simplifies the coordination of transmitting and receiving circuits as to frequency without difficulties with frequency drift, tuning adjustments, the necessity of complex controls, or the like. Further the apparatus is relatively simple in construction and reliable in operation, and lends itself flexibly to different types of propagative wave energy system applications, including but not necessarily limited to those mentioned above.

With these and other objects in view the invention in one aspect comprises a method of operating a propagative wave energy system wherein the wave energy pulses are generated at successively different frequencies and such wave energy is utilized in the receiver in the particular periods immediately following said pulses substantially only at such individual pulse wave energy frequencies, respectively. As a result wave energy occuring in any particular interval between successive generated pulses at a frequency materially different from the frequency of the pulse generated at the initiation of said interval will be rejected or go undetected.

The preferred apparatus comprises means whereby the transmitter and receiver of propagative wave energy signal frequencies are both returned in operating frequency in step-wise manner, from pulse to pulse, and by the same frequency control means, in order to assure coordination between such circuits. Furthermore said returning means changes the operating frequency of the transmitter and receiver circuits in a cyclicly recurrent pattern, synchronized with the transmitted pulses so as to insure definite separation of frequencies of succeeding pulses in progressive step-by-step manner from an initial frequency and continuing over a period of sufficient length to insure the dying out of final echoes or other potentially interfering after-effects before returning to the initial frequency and repeating the cycle of frequency variation. In that connection means are provided by which to establish or control the number (which may be one or greater) of steps or changes in frequency of definite increments which may take place from a starting frequency to a final frequency before returning to said starting frequency to commence the stepping action over again, while remaining within the frequency band width of the transducer element and other fixed-tuned elements in the system. Still other provisions in the circuit enable adjusting or changing the magnitude of the increments of frequency change effected from cycle to cycle of operation.

More specifically a continuously operated variable-frequency local oscillator tuned by a reactance tube modulator produces a signal which is fed to a mixer in the transmitter and a mixer in the receiver, in order to convert the frequency of a pulsed transmitting oscillator to a desired propagative wave energy frequency which may be varied, and to convert that same wave energy frequency in the receiver back to a standard frequency, which is always the same, capable of amplification in an intermediate-frequency amplifier stage of a high degree of selectivity. The local-oscillator frequency is changed in steps by means of successive increments of charge accumulated in a condenser and applied as voltage to the reactance tube modulator, and when the charge on the condenser reaches a predetermined magnitude a condenser discharge circuit is triggered thereby in order to initiate the process over again. Short impulses of current for charging the condenser progressively by increments are derived from a circuit for pulsing the transmitter oscillator and thereby initiate a change of local oscillator frequency synchronously with the initiation of each transmitted pulse as desired.

These and other features, objects and advantages of the invention, including certain details of the preferred type of apparatus, illustrating the invention, will become more fully apparent from the following description by reference to the accompanying drawings.

FIGURE 1 is a schematic diagram of an illustrative pulse-echo type detecting system employing the invention.

Figure 2:
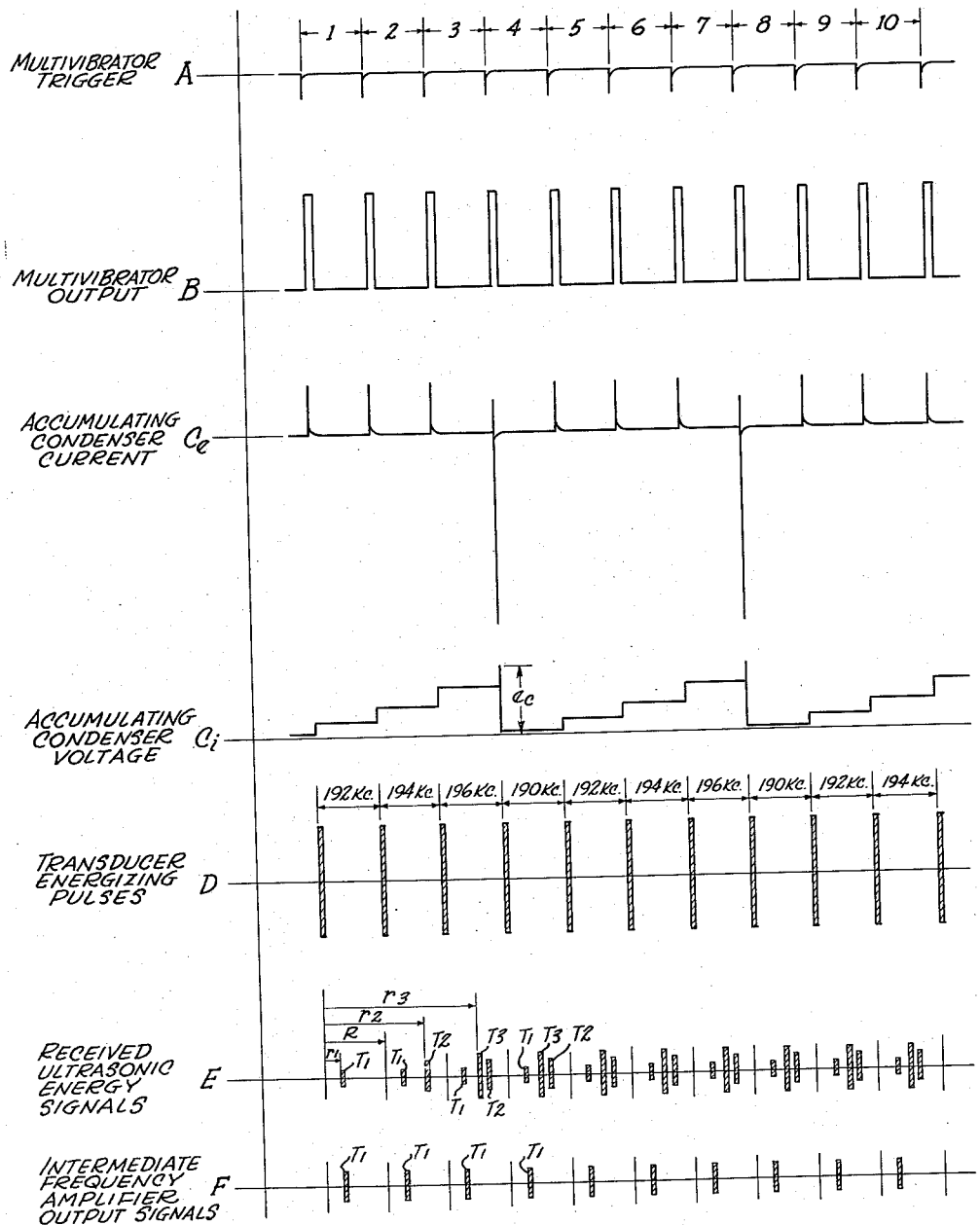
FIGURE 2 is a current and voltage time graph showing the approximate nature of several electrical wave forms entering into the operation of the illustrated system.

In FIGURE 1 certain components, which may be of a conventional nature, are shown in block diagram form as a means of simplifying the diagram and shortening the description of the system. The receiver and indicator circuits in general are designated by a dotted-line bracket as are the transmitter circuits. The illustrative circuits controlling operation of the basic transmit-receive system in accordance with the present invention are located in the diagram between the two brackets.

A single ultrasonic transducer 10 is employed both for transmission and reception of ultrasonic energy pulses. It will of course be understood that suitable physical provisions are made for the mounting of transducer 10 to operate below the water's surface in this type of system. Pulses of electrical energy at ultrasonic frequencies are applied to the transducer from transmitter output amplifier 12 by means of the inductive coupling between the coil 14 in the amplifier plate circuit and the coil 16 connected across the transducer terminals, resulting in transmission of ultrasonic energy through the water in a beam having an intensity pattern determined by the transducer design. Ultrasonic energy returning from reflecting objects within the beam impinge the transducer 10 which converts them into electrical signals of the original frequency. These low-amplitude signals are applied to the receiver input ultrasonic frequency amplifier 18 by means of the inductive coupling between transducer coil 16 and the coil 20 connected appropriately in the input circuit of such latter amplifier. Coil 14 is tuned to the ultrasonic frequency operating band of the system by condenser 14a, and coil 20 by condenser 20a, but for a reason which will become evident the "Q" of these L.-C. circuits is not high, so that their bandwidth between half-power points is fairly large (preferably somewhat in excess of six kilocycles in the example). A cyclic automatic gain control circuit comprising gaseous discharge diode T connected across condenser 20a, and the R-C network N connected in series with the two to ground is disclosed and claimed in my copending application Serial No. 275,831, filed Mar. 10, 1952, for Ultrasonic Underwater Detecting System, now U.S. Patent No. 2,759,783, issued August 21, 1956.

Disregarding for the moment the matter of ultrasonic frequency at which the transducer is operated, recurrent pulses of electrical energy at ultrasonic frequency are generated in the transmitter circuits by triggering of the multivibrator circuit comprising tubes V2 and V3, which produces short, flat-topped direct voltage pulses at point B for application through coupling condenser 22 to the modulator-amplifier 24 that drives the pulsed transmitting oscillator 26. Output of the pulsed oscillator is applied to transmitter output amplifier 12 after undergoing frequency conversion in the mixer 28, the purpose and effect of which is described subsequently.

The multivibrator comprising tubes V2 and V3 is of a conventional type. The positive bias applied to the cathode of tube V3 through resistor 30 normally maintains this tube in the nonconductive state, whereas the lack of bias on tube V2 permits it to conduct normally establishing the potential at its anode at a value not greatly above ground potential. The roles of the two tubes are reversed by the inception of a negative trigger pulse applied to the control grid of tube V2 reducing the current flow in that tube and causing its anode potential to rise. In typical multivibrator fashion, this rise of potential at the anode of V2 is applied to the control grid of tube V3 and initiates current flow therein to produce an immediate drop of potential at the anode of V3 for application to the control grid of V2. In cumulative fashion tube V2 is driven below cut-off and tube V3 is driven to conduct heavily, and this takes place in an extremely short interval of time so that the anode potential of tube V2 rises instantaneously to a high positive value where it remains for a length of time, constituting the length or duration of each transmitted pulse, determined by the time constants and voltages controlling operation of the circuit as a multivibrator, according to well understood principles. At the end of such time the blocking voltages developed in the multivibrator circuit have dissipated to the point that an abrupt reversal of the roles of the tubes V2 and V3 takes place restoring the anode of V2 to its quiescent value, at which value it remains until a succeeding trigger pulse is applied to its control grid as previously.

Recurrent triggering of the multivibrator to pulse the transmitter oscillator is timed by the synchronizer 32 which periodically renders the gaseous discharge triode V1 conductive. A storage condenser 34 having one terminal connected to the cathode of V1 has its opposite terminal connected to a source B+ of positive potential through the variable resistor 36, and also to the anode of V1 through the current-limiting resistor 38. This condenser is normally charged to a voltage established by the setting of the variable contact of voltage divider 40 which has a moveable contact connected to the cathode of tube V1 and a winding conected across the voltage source terminals as shown. The contact of potentiometer 40 is set so that the cathode potential of tube V1 is high enough in relation to the quiescent grid potential to hold the tube normally nonconductive. When a positive trigger pulse is applied by synchronizer 32 to the grid of tube V1 the tube is rendered conductive and condenser 34 discharges abruptly through the tube, causing a sudden drop of potential which is applied as a negative pulse through a coupling condenser 42 to trigger multivibrator tube V2. Tube V1 deionizes almost immediately upon substantial completion of discharge of condenser 34 because the combined voltage drop through resistors 36 and 38 resulting from that component of anode current in the tube delivered directly by the power supply lowers the plate voltage below the point sufficient to maintain ionization in the tube. Thus the recharging cycle of condenser 34 is immediately initiated preparatory to application of the succeeding timing pulse from synchronizer 32.

Thus with each timing pulse applied by synchronizer 32 to the gas tube V1 the multivibrator comprising tubes V2 and V3 is triggered and a pulse of ultrasonic energy is generated by the transducer 10.

The synchronizer also initiates operation of suitable indicator circuits 44, such as cathode ray tube indicators of the PPI or A-scope type, or any other suitable type of indicator capable of measuring or indicating the time interval elapsing between the transmission of an ultrasonic energy pulse and the reception of any ensuing echo pulses, permitting determination of distance to reflecting objects producing the respective echoes. Obviously it is unimportant to the measurement of the elapsed time interval whether the synchronizing or timing pulses triggering the indicator and transmitter circuits originate in the indicator circuits themselves, or whether a separate synchronizer is employed, as in the example.

The echo impulses impinging the transducer 10 are converted into ultrasonic frequency electrical energy and applied to the amplifier 18 before application to the mixer 46, wherein the frequency is converted to a value at which the intermediate-frequency amplifier 48 is tuned to operate. The intermediate-frequency signals are applied to the detector 50 which converts them into a form suitable for application to the indicator circuits preferably in conventional fashion.

It is necessary, of course, that the receiving channel of the system be tuned to the frequency of the transmitting channel if the underwater reflections from propagating transmitted pulse energy are to be detected. It is also essential to maximum sensitivity of the system that the tuning or frequency selection of the receiver match the pulse transmission frequency during that portion of the interval following any particular transmitted pulse during which detection of echoes is desired. However, it is not necessary that the system operate at the same frequency during each transmission-reception cycle, and this is the basis upon which the present invention is predicated.

In accordance with this invention, a local oscillator comprising tube V9 supplies a continuous wave oscillation of controlled variable frequency to the mixer 28 in the transmitter channel and also to the mixer 46 in the receiver channel. Assuming for purposes of illustration that the frequency of this local oscillator is 645 kilocycles per second and that the pulsed oscillator 26 in the transmitter channel generates 455 kilocycles per second when pulsed, the mixer 28 will then produce output pulse oscillations at a prequency representing the difference, namely 190 kilocycles per second, which is the ultrasonic energy frequency applied to the transducer 10. Barring slight shifts due to any Doppler effect, it is also, of course, the frequency of ultrasonic energy converted to electrical form by the transducer 10 as the result of reflections from remote underwater objects detected by the transducer, so that the mixer 46 receives both 190 kilocycle energy and 645 kilocycle energy. The resultant difference frequency, or 455 kilocycles, is applied to the intermediate-frequency amplifier 48, which is preferably of a sharply tuned type adjusted to respond selectively to that frequency and not appreciably to materially different frequencies. It will be noted that the pulsed oscillator 26 and the intermediate-frequency amplifier 48 are tuned to the same frequency. Accordingly, even if the frequency of the local oscillator tube V9 is changed to a different value, such as 651 kilocycles per second, the ultrasonic transducer is energized at a different frequency (196 kilocycles) during pulse transmission and reception but the intermediate-frequency amplifier 48 still receives the echo signals at the original pulsed-oscillator frequency (455 kilocycles), which remains constant.

However, should the operating frequency of the local oscillator comprising tube V9 be changed materially during the interval following transmission of a pulse at one frequency, then the difference between the new local oscillator frequency and the ultrasonic energy frequency produced by input amplifier 18 caused by reflections from that transmitted pulse will no longer correspond to the value at which intermediate-frequency amplifier 48 is sensitive so that they will either not reach the indicator circuits at all or will do so with virtually no amplification. Thus by establishing the operating frequency of the local oscillator at a materially different value with the initiation of each succeeding transmitted pulse, and after each pulse is transmitted holding its new frequency substantially constant during the desired reception interval before the next succeeding transmitted pulse, the receiver rejects any echo signals caused by the preceding transmitted pulse or pulses. If the intermediate-frequency amplifier 48 is very sharply tuned relative to the frequency shift of the local oscillator established from pulse to pulse, as is readily possible, the rejection is virtually complete. At the same time it can still be sufficiently broad in its frequency response to include Doppler shift of desired echo signal. It is not possible to specify any particular degree of selectivity of the intermediate-frequency amplifier 48 except to state that in order to gain the benefits of the invention, it should be sufficiently selective that it will be capable of amplifying signals at the correct frequency while amplifying to a very slight degree or substantially not at all signals which differ, in the example at least, by as much as 2 kilocycles per second therefrom. Of course this difference may be increased either by increasing the selectivity of the IF amplifier or by increasing the magnitude of the frequency shifts caused in the local oscillator with or before the inception of each transmitted pulse. The input amplifier 18 and output amplifier 12 have a bandwidth sufficient to accommodate the variation of frequency amounting to 6 kilocycles in the example. Likewise the bandwidth of the transducer 10 embraces that range of frequencies.

While the foregoing described effect may be achieved simply by shifting the local oscillator frequency back and forth alternately between two frequencies materially separated from each other in terms of the selectivity of intermediate-frequency amplifier 48 it is preferable in many instances to increase the number of pulse cycles which transpire before the local oscillator is returned to a frequency at which it had previously operated. Thus, instead of returning the local oscillator to a particular frequency on every other pulse cycle in the simplest form of the system, it is preferable to do so only after every second, third, fourth or greater number of transmitted pulses, because in some applications of the invention it may require these grater lengths of time for the undesired echoes or other effects of a transmitted pulse to die out or become undetectable when the receiver is retuned to their frequency. In the example, frequency of the local oscillator is shifted progressively by increments continuing over a period lasting four complete transmission-reception cycles of operation of the system. During the initial cycle, its frequency is 645 kilocycles per second, during the next succeeding cycle of operation its frequency is 647 kilocycles, then 649 kilocycles, and finally 651 kilocycles. Not until the end of the latter cycle of operation is the local oscillator frequency restored to its initial value of 645 kilocycles per second and the process of progressive frequency change repeated. The transmission and reception ultrasonic frequency correspondingly changes from 190 kilocycles per second to 192 kilocycles, to 194 kilocycles, to 196 kilocycles and back again to 190 kilocycles per second, etc. This four-step cyclic variation of local oscillator frequency continues to take place as long as the system operates.

In order to accomplish the foregoing described shift of local oscillator frequency, a reactance tube V8 utilizing the Miller effect is connected across the local oscillator L.-C. circuit to vary the tuning thereof. The input capacitance of tube V8 is added to the capacitance of such L.-C. circuit and is variable as a function of applied grid voltage.

In order to provide the desired step function of voltage required on the control grid of tube V8 to change the local oscillator frequency by progressive increments, an accumulator condenser 52 is provided having one terminal connected to ground and its opposite terminal connected to the cathode of the rectifier V6. The anode of this rectifier is connected to the anode of multivibrator tube V2 through the condenser 54 which is small in relation to the capacitance of condenser 52. A second rectifier V5 having a grounded anode has its cathode connected to the anode of rectifier V6. The cathode of the latter is also connected to the control grid of the blocking oscillator tube V4 and to the control grid of a cathode-follower amplifier V7 which drives the reactance tube V8.

When the multivibrator V2 is triggered positively in order to produce the rectangular pulse which drives the transmitter oscillator, the sudden rise of potential at the anode of tube V2 causes a surge of current to flow in the series circuit including condenser 54, rectifier V6 and condenser 52. The combined electrical resistance of this circuit, including the resistance of rectifier V6, is such that condenser 54, being the smaller of the two condensers, becomes fully charged almost instantaneously whereas condenser 52 receives a comparatively small charge during that short instant of time. This action transpires during the very early portion of the rectangular voltage pulse generated at the anode of multivibrator tube V2, so that the charge potential applied by condenser 52 to the grid of cathode follower V7 reaches its higher value in time to shift the local oscillator frequency, hence the actual transmitted pulse frequency produced by mixer 28, to a new value before any appreciable amount of energy at ultrasonic frequency has been applied to the transducer by output amplifier 12. Upon termination of the positive-going pulse at the anode of tube V2, condenser 54 immediately discharges to its original state through rectifier V5. However, the polarity of rectifier V6 is such that accumulating condenser 52 retains the increment of charge which it received at the inception of such pulse. Thus the condenser voltage applied by cathode-follower V7 to the control grid of reactance tube V8, hence the operating frequency of the local oscillator, is maintained substantially constant during the entire interval of time commencing with the inception of the transmitted pulse until the inception of the next succeeding transmitted pulse. Any slight leakage of charge from condenser 52 during such interval is negligible due to the high input impedance of cathode-follower V7 and the nonconductive state of blocking oscillator tube V4. When the next succeeding transmitted pulse is initiated, the action previously described repeats itself, condenser 52 receiving a further increment of charge during the short instant required to impart a full charge to the smaller condenser 54 as a result of the rise of voltage at the anode of tube V2, and the local oscillator frequency is shifted by another increment.

After condenser 52 has received three such increments of charge in the example the potential at the grid of blocking oscillator tube V4 is sufficiently high in relation to its cathode that the fourth or succeeding increment of charge applied to such condenser overcomes the effect of quiescent bias applied by voltage divider 56 to the cathode of the blocking oscillator tube V4 and triggers the blocking oscillator circuit into operation. Flow of grid current then occurring in the tube V4 immediately discharges condenser 52 and restores the potential at the grid of cathode follower V7 substantially to ground, its initial potential. This takes place in the very early portion of the multivibrator pulse so that the local oscillator frequency is restored to its initial value in time to convert the frequency of substantially all of the transmitted pulse oscillations passing through mixer 28. The series-connected rectifiers V5 and V6 function as clamping elements which insure a return of this potential always to the same value on succeeding quadripulse cycles.

A stepped-wave function generating circuit is thereby provided utilizing a storage condenser charged by substantially equal increments over a period of pulse cycles until the charge reaches a predetermined value and triggers a circuit capable of discharging the condenser to its initial condition, whereupon the charging cycle repeats itself. The variable resistor 60 in the cathode return of cathode-follower V7 enables varying the gain of that amplifier and thereby the magnitude of the voltage increments applied to the reactance tube V8. In the example, this gain is established at a value causing 2 kilocycles per second frequency change of the local oscillator with each such incremental voltage change. Bias voltage divider 56 in the cathode return of blocking oscillator V4 may be used to vary the grid voltage required to trip the blocking oscillator and thereby discharge condenser 52. Consequently this potentiometer is suitable as a means of controlling the number of increments or steps in the voltage wave developed by condenser 52. By proper circuit design and adjustment, therefore, the progressive incremental variation of local oscillator frequency may be varied both as to the magnitude of the incremental changes and as to the total number of changes occurring before frequency is restored to an initial value.

It is preferred, of course, that the change of system ultrasonic frequency on successive cycles of operation be controlled in a definite repeating pattern, as described, because a random type of variation might not always provide the desired degree of discrimination between desired echo pulses and those which are irrelative to indicator timing.

Obviously any other suitable means by which the transmitter and receiver channels may be shifted in frequency by increments with the inception of succeeding pulse cycles of the system may be employed in lieu of the illustrated means.

Should it be considered preferable in some instances to shift the local oscillator frequency somewhat in advance of the initiation of the pulse applied to oscillator 26, there are obviously various well known techniques by which this could be carried out without impairing the operation of the system for its intended purpose. For instance, a suitable delay network could be inserted in the modulator circuits at points X or Y in order to permit the accumulating condenser 52 to acquire its new increment of charge before the application of the drive pulse to the pulsed oscillator 26. This would insure that all energy of the transmitted pulse would occur at the correct frequency, whereas in the illustrated circuits a slight, although, for most purposes, negligible amount of this energy would be generated at the former pulse frequency due to the small but finite time required for condenser 52 to receive an increment of charge.

In the normal sonar system application, it is usually desirable to establish the repetition rate of synchronizer 32 at maximum value consistent with the range requirements of the system, which means that the shift of local oscillator frequency during the interval between any two consecutive transmitted pulses should not be made until the end or near the end of that interval. Otherwise an object lying near the outer range limit of the system will go undetected. Apart from this consideration, however, which involves a matter of preference or choice in the design or adjustment of the system, the local oscillator frequency may be shifted at any time during the reception interval up to and including the inception of the succeeding transmitted pulse which ends that interval. Of course, if it is shifted late during the actual generation of the succeeding transmitted pulse energy, some of that energy will be wasted, causing an effective reduction of system power, because the receiver will be insensitive to the portion of it which is generated at the previous pulse frequency. However, to the extent that a pulse of ultrasonic energy is propagated by the transducer at the new frequency established by the shift of local oscillator frequency, the system will operate in the intended manner to detect reflecting objects within the range of operation.

FIGURE 2 illustrates in graphical form the operation of the system shown in FIGURE 1 under an assumed set of conditions. It is assumed that the transducer 10 is directed through the water into a region in which three sonar "targets" lie situated. The first of these targets T1 lies at a range $r1$ from the system which is within its normal operating range. That is, the reflections from this target resulting from any transmitted pulse of ultrasonic energy will be received back in the system as signals (bearing similar identification in FIGURE 2—E,F) well in advance of the next succeeding transmitted pulse. The next of these targets, T2, lies at a range $r2$ which exceeds the maximum operating range of the system by a distance which causes the reflections therefrom to be received by the system in the second reception interval following any given transmitted pulse. Finally the third of these targets, T3, lies at an even greater range $r3$ such that its echo signals are received in the third reception interval following the respective transmitted pulses producing them. It may even be assumed, for emphasis, that the targets T2 and T3 are sufficiently large in relation to the target T1, or have a sufficient capacity to reflect ultrasonic energy, that the strength of the echo signals which they produce even at their greater ranges are larger than the signal produced by the target T1.

In FIGURE 2 the transmission-reception periods of system operation are consecutively numbered at the top of the figure. Waveform A represents the trigger pulses applied to the control grid of multivibrator tube V2 at point "A" in FIGURE 1. Waveform B represents the series of positive-going rectangular pulses generated at the anode of multivibrator tube V2 (point "B" in FIGURE 1) for application to modulator-amplifier 24. The series of shaded rectangles in graph D represent the envelopes of the resultant ultrasonic energy pulses delivered by output amplifier 12 for application to the transducer 10. The energy pulse associated with cycle No. 1 is produced at 192 kilocycles per second, that associated with cycle No. 2 at 194 kilocycles per second, that with cycle No. 3 at 196 kilocycles per second, that associated with cycle No. 4 at 190 kilocycles per second, etc., as designated. Correspondingly the receiver of the system is rendered sensitive to the respective frequencies indicated during the particular intervals between the succeeding pulses. Thus the receiver is tuned to respond to 192 kilocycles during interval No. 1, to 194 kilocycles during interval No. 2, etc., while rejecting materially different frequencies.

Diagram $Ci$ represents the charging current impulses flowing into accumulating condenser 52 at point C in FIGURE 1, and diagram $Ce$ represents the stepped-wave function of voltage on condenser 52. It will be noted in graph $Ci$ that at the initiation of intervals 4 and 8 a large negative surge of condenser current takes place representing the discharge of condenser 52 caused by operation of the blocking oscillator after condenser voltage rises above the critical control grid potential $e_c$ of tube V4.

Graph E, represents the above-described ultrasonic energy frequency signals occurring at point "E" in FIGURE 1. Graph F illustrates the fact that only the signals T1, representing a reflecting object within the operating range of the system, pass the intermediate frequency amplifier 48 and reach point F in FIGURE 1. Signals T2 are rejected by the receiver because they are received during intervals when the receiver is sensitive to frequencies differing by 2 kilocycles per second from the signals T2. Likewise signals T3 are also rejected inasmuch as they occur at frequencies differing by 4 kilocycles per second from the receiver selection frequency during the respective intervals when they enter the mixer 46. Thus even though the signals T2 and T3 may be of greater intensity than signals T1, they are rejected by the system.

I claim as my invention:
1. A wave energy system comprising means to transmit and receive wave energy at the same frequency, variable tuning means controlling said transmitting and receiving means to vary said transmitting and receiving frequency, pulsing means periodically operating said transmitting means, and frequency control means adjusting said tuning means by steps responsively to successive operations of said pulsing means and thereby retuning said transmitting and receiving means to corresponding different frequencies on successive transmitted pulses.

2. An electrically operated wave energy system comprising circuit means to generate and means to utilize alternating current energy at the same frequency, variable tuning means controlling said generating and utilizing means to vary said frequency, pulsing means periodically operating said generating means, and frequency control means adjusting said tuning means by steps responsively to successive operations of said pulsing means and thereby retuning said generating and utilizing means to corresponding different frequencies on successive transmitted pulses.

3. The system defined in claim 2, wherein the variable tuning means comprises voltage controlled reactance circuit means, and the frequency control means comprises a storage condenser, means responsive to successive operations of the pulsing means for changing the charge in said storage condenser by progressive increments, means applying condenser voltage to said reactance circuit means, and means periodically operable to discharge said condenser to a predetermined value and thereby initiate a new cycle of progressive frequency change in the system.

4. A propagative wave energy system of the pulse operated type comprising a transmitter operable to generate propagative wave energy frequencies, pulse modulator means operable to pulse said transmitter recurrently, a receiver selectively attuned to the transmitter frequency, and recurrently operable tuning means synchronized with said pulse modulator means substantially simultaneously changing the operating frequency of said transmitter and receiver alike at the initiation of each transmitted pulse substantially for the duration of the period to the initiation of the next succeeding pulse.

5. The system defined in claim 4, wherein the transmitter comprises a pulsed oscillator and a mixer stage receiving the output of such oscillator, the receiver comprises a mixer stage receiving the input of the receiver and intermediate-frequency amplifier means tuned to a frequency corresponding to that of said pulsed oscillator and connected to receive the output of said latter mixer stage, and the recurrently operable tuning means comprises a continuously operated local oscillator having output connections for delivering oscillations thereof to both of said mixer stages, variable reactance means controlling the frequency of said local oscillator, and pulse-actuated reactance control means varying the value of said reactance means progressively by steps with successive pulsing of such control means, the system further comprising recurrently operative pulsing means for actuating both said reactance control means and the pulse modulator means.

6. A pulse-echo type propagative wave energy system comprising a transmitter circuit operable to generate propagative wave energy electrical frequencies, pulse modulator means operable to pulse said transmitter recurrently, a receiver selectively attuned to the transmitter frequency, means for converting said electrical frequencies into propagative wave energy and for converting propagative wave energy reflections back into electrical signals for energizing said receiver, and recurrently operable tuning means synchronized with said pulse modulator means substantially simultaneously changing the operating frequency of said transmitter and receiver alike at the initiation of each transmitted pulse substantially for the duration of the period to the initiation of the next succeeding pulse.

7. A pulse-echo type detecting system comprising a transmitter and a receiver of propagative wave energy, said transmitter including a pulsed oscillator, a mixer energized thereby, and means for converting the mixer output electrical oscillations into propagative wave energy, said receiver including a mixer, means for converting propagative wave energy into corresponding electrical oscillations for application to said latter mixer, and a frequency selective intermediate-frequency amplifier receiving the output of said mixer, tuned to a frequency corresponding to said pulsed oscillator frequency, a local oscillator feeding oscillations substantially continuously to said mixers to produce beat frequencies therein to which said first converting means and said intermediate-frequency amplifier respond, respectively, reactance tube modulator means controlling the operating frequency of said local oscillator, means for applying a variable control voltage to said reactance tube modulator means comprising a storage condenser for accumulating a charge applied as voltage to said modulator means, charging means applying recurrent pulses of charging current to said condenser for changing the charge accumulated therein by progressive increments, and thereby the local oscillator frequency by progressive increments, means for restoring the accumulated condenser charge to an initial value automatically with the passage of a predetermined number of condenser charging pulses and thereby return the local oscillator frequency to a corresponding initial value periodically, and means operated synchronously with said charging means for pulsing said transmitter oscillator concurrently with the changes of local oscillator frequency.

8. The system defined in claim 7, wherein the charging means comprises a pulse generator producing a condenser charging voltage pulse of predetermined amplitude and duration recurrently, and a condenser charging circuit receiving said voltage pulse, including means in series with the storage condenser limiting the pulse current flow in said condenser at a value producing a change in voltage in said condenser during each such pulse equal to a small fraction of said pulse amplitude.

9. The system defined in claim 8, wherein the charge restoring means comprises a biased blocking oscillator circuit triggered by progression of storage condenser voltage to a predetermined value and operable thereby to discharge said condenser.

10. The system defined in claim 8, wherein the charging circuit charge limiting means comprises a condenser of materially smaller capacity than the storage condenser, and means connected to said smaller condenser for removing accumulated charge therefrom during the periods between pulses without also discharging said storage condenser.

11. The system defined in claim 10, wherein the last-mentioned means comprises a rectifier element connected between the two condensers in series therewith and with electrodes arranged to permit charging current to flow therein, and a second rectifier element connected from between the smaller condenser and the first rectifier element to a point of discharge for said smaller condenser, the electrode arrangement of the second rectifier element being the reverse of said first rectifier element relative to said smaller condenser.

References Cited in the file of this patent

UNITED STATES PATENTS

| 2,405,134 | Brown | Aug. 6, 1946 |
| 2,491,540 | Wiseman | Dec. 20, 1949 |
| 2,514,482 | Farmer | July 11, 1950 |
| 2,522,367 | Guanella | Sept. 12, 1950 |
| 2,593,330 | Mohr | Apr. 15, 1952 |
| 2,624,876 | Dicke | Jan. 6, 1953 |

OTHER REFERENCES

Radar Electronic Fundamentals, NAVSHIPS 900,016, Bureau of Ships, Navy Dept., Washington, D.C., June 1944. Pages 233 through 235 relied on.